US012785997B2

(12) United States Patent
Leonti et al.

(10) Patent No.: US 12,785,997 B2
(45) Date of Patent: Nov. 3, 2026

(54) METHOD AND SYSTEM FOR AUTOMATIC ML-DRIVEN, PRIVACY-PRESERVING CONFERENCE ROOM SELECTION USING ML TECHNIQUES

(71) Applicant: Unify Patente GmbH & Co. KG, Munich (DE)

(72) Inventors: Anastasia Leonti, Gerakas (GR); Nikolaos Sidiropoulos, Athens (GR); Zisis Tsiatsikas, Salonika (GR)

(73) Assignee: UNIFY BETEILIGUNGSVERWALTUNG GMBH & CO. KG, Munich (DE)

( * ) Notice: Subject to any disclaimer, the term of this patent is extended or adjusted under 35 U.S.C. 154(b) by 192 days.

(21) Appl. No.: 18/888,397

(22) Filed: Sep. 18, 2024

(65) Prior Publication Data

US 2025/0106057 A1 Mar. 27, 2025

(30) Foreign Application Priority Data

Sep. 22, 2023 (EP) .................................... 23199239

(51) Int. Cl.

| | |
|---|---|
| ***H04L 12/18*** | (2006.01) |
| ***G06F 40/284*** | (2020.01) |
| ***H04L 65/1073*** | (2022.01) |
| ***H04L 65/1093*** | (2022.01) |

(52) U.S. Cl.

CPC ........ *H04L 12/1822* (2013.01); *G06F 40/284* (2020.01); *H04L 65/1073* (2013.01); *H04L 65/1093* (2013.01)

(58) Field of Classification Search

CPC ............ H04L 12/1822; H04L 65/1073; H04L 65/1093; G06F 40/284; G06Q 10/0287; G06Q 10/06; G06Q 10/10; G06Q 10/00

See application file for complete search history.

(56) References Cited

U.S. PATENT DOCUMENTS

| | | | |
|---|---|---|---|
| 10,455,164 | B2 | 10/2019 | Kukosa |
| 10,516,881 | B2 | 12/2019 | Karimi-Cherkandi et al. |
| 10,652,297 | B2 | 5/2020 | Totzke et al. |
| 10,685,668 | B2 | 6/2020 | Totzke |
| 10,944,658 | B2 | 3/2021 | Volkmann et al. |
| 11,233,375 | B2 | 1/2022 | Matsui |
| 11,558,437 | B2 | 1/2023 | Ruetschi et al. |

(Continued)

FOREIGN PATENT DOCUMENTS

| | | | |
|---|---|---|---|
| EP | 4102833 | A1 | 12/2022 |
| WO | 2018201009 | A1 | 11/2018 |

OTHER PUBLICATIONS

European Search Report for European Patent Application No. 23 19 9239 dated Feb. 26, 2024.

*Primary Examiner* — Philip C Lee

(74) *Attorney, Agent, or Firm* — Buchanan Ingersoll & Rooney PC

(57) ABSTRACT

A method and a system can be configured for automatically selecting the most appropriate conference rooms for a user based on his/her input and profile preferences. Machine learning (ML) techniques and blockchains can be utilized in conjunction with such services. Additionally, the method and system can be configured to offer a solution to privacy problems that may come up in the formulation of blocks in a blockchain that hold pieces of personal information.

17 Claims, 5 Drawing Sheets

(56) References Cited

U.S. PATENT DOCUMENTS

| | | | | |
|---|---|---|---|---|
| 11,627,222 | B2 | 4/2023 | Tsiatsikas et al. | |
| 11,729,224 | B2 | 8/2023 | Tsiatsikas et al. | |
| 11,800,344 | B2 | 10/2023 | Pagonis et al. | |
| 11,805,399 | B2 | 10/2023 | Tsiatsikas et al. | |
| 11,956,706 | B2 | 4/2024 | Pagonis et al. | |
| 12,035,138 | B2 | 7/2024 | Tsiatsikas | |
| 2011/0228922 | A1 * | 9/2011 | Dhara ................ | G06Q 10/1093<br>379/202.01 |
| 2018/0046957 | A1 * | 2/2018 | Yaari .................... | G06Q 10/109 |
| 2022/0094544 | A1 | 3/2022 | Sekar et al. | |
| 2022/0351152 | A1 * | 11/2022 | Giacomelli ........ | G06Q 10/1093 |

* cited by examiner

METHOD AND SYSTEM FOR AUTOMATIC ML-DRIVEN, PRIVACY-PRESERVING CONFERENCE ROOM SELECTION USING ML TECHNIQUES

CROSS-REFERENCE TO RELATED APPLICATIONS

The present application claims priority to European Patent Application No. 23 199 239.7, filed on Sep. 22, 2023. The entirety of this patent application is incorporated by reference herein.

FIELD

The present invention relates to a method and a system for automatic conference room selection.

BACKGROUND

During the last decade there is a blooming in online services. This is mostly due to the advancements in the information technology (IT) sector which shapes the environment and creates a fertile ground for internet evolution.

Among others, online conferences comprise one of the most popular types of services offered over the internet. It is a fact that communication and collaboration software is used in a wide range of activities in the everyday life. Online conferences have become larger over the last years, with participants from all around the world. Not only in the working environment, where for instance during the Corona pandemic most of the employees were working from home, but also in the health sector, online conferences have gained a growing popularity during the last years and are still increasing.

SUMMARY

One problem with online conferences that the participants face is the fact that there might be malevolent users wanting to misuse sensitive data of other users like health issues. It is thus very important for participants of online conferences to know that their data are secured from misuse by other users. Usually, the participants select the conference rooms that they want to join based on the level of relevance to their activities or interests.

Embodiments of the present invention can be configured to provide a more convenient and easy way to handle the selection process of conference rooms wherein their shared data are secured from fraud, and to overcome the drawbacks of the state of the art. For instance, some embodiments of the present invention can based on an object to provide a method for automatic conference room selection and a corresponding system for performing the method.

For example, a method and a system are provided which can facilitate automatic selection of the most appropriate conference rooms for a user based on his/her input and profile preferences. The method makes use of machine learning (ML) techniques and blockchains. Additionally, embodiments of the method and system can offer a solution to privacy problems that may come up in the formulation of blocks in a blockchain that hold pieces of personal identifiable information.

In the meaning of the invention, personal identifiable information (PII) is any information related to an identifiable individual, e.g. his/her name, information about the age or sex, social security number, date and place of birth, biometric records, information about the residence or health, etc.

In the meaning of the present invention, machine learning (ML) is a field devoted to understanding and building methods that let machines "learn"—that is, methods that leverage data to improve computer performance on some set of tasks. It is seen as a broad subfield of artificial intelligence (AI). ML algorithms build a model based on sample data, known as training data, in order to make predictions or decisions without being explicitly programmed to do so. ML algorithms are used in a wide variety of applications, such as in the medical field, email filtering, speech recognition, the agricultural sector, and computer vision, where it is difficult or unfeasible to develop conventional algorithms to perform the needed tasks.

In the meaning of the present invention, a blockchain is a distributed ledger with growing lists of records (blocks) that are securely linked together via cryptographic hashes. Each block contains a cryptographic hash of the previous block, a timestamp, and transaction data. The timestamp proves that the transaction data existed when the block was created. Since each block contains information about the previous block, they effectively form a chain, with each additional block linking to the ones before it. Consequently, blockchain transactions are irreversible in that, once they are recorded, the data in any given block cannot be altered retroactively without altering all subsequent blocks. Blockchains are typically managed by a peer-to-peer (P2P) computer network for use as a public distributed ledger, where nodes collectively adhere to a consensus algorithm protocol to add and validate new transaction blocks. Although blockchain records are not unalterable since blockchain forks are possible, blockchains may be considered secure by design and exemplify a distributed computing system with high Byzantine fault tolerance.

In the meaning of the present invention, k-anonymity is a formal privacy model that can be used to make statements about anonymized datasets. A publication of data provides k-anonymity if the identifying information of each individual is indistinguishable from at least k−1 other individuals, making it difficult to correctly link them to their associated sensitive attributes. The letter k thus represents a parameter that is replaced by a natural number in the specific case. A larger k represents greater anonymity in this context.

In the meaning of the present invention, the terms "user" and "participant" are used interchangeably referring to an individuum attending an online conference.

A method for automatic conference room selection in a system comprising a blockchain (1), a conference server (2), a machine learning (ML) engine (3), a database for conference and user data (4), and at least two conference rooms is provided, wherein the method comprises the steps of receiving, by the system, a user registration; requesting, by the system, from the user to set desired preferences; requesting, by the system, input from the user; analyzing, by the ML engine, the user's input; providing, by the system, a list of conference rooms to the user, in case no discrepancy between the user's preferences and input is detected by the system; selecting, by the user, a conference room and joining the meeting.

In a preferred embodiment, the provision of the list of conference rooms to the user is performed by a conference server or another server/entity within the system.

In the meaning of the present invention, preferences include preferences related to privacy aspects, like deselection of other participants of the meeting room who should not follow the user in other meeting rooms, number of participants in the same meeting room, selection of specific moderators, practitioners and/or doctors as well as other preferences.

In the meaning of the present invention, input is related to problems/issues the user faces, selected from health issues, marriage, family and/or friends' issues, and work/school issues or other issues.

In some embodiments, the user may use a web interface, like a webpage, a browser, an app or voice commands for setting the desired preferences.

The user may use video, audio, or text to give his/her input in some embodiments.

According to a preferred embodiment, in case a discrepancy between the user's preferences and input is detected, the method further comprises: proposing, by the system, new preferences to the user; providing, by the system, a list of conference rooms to the user, in case the user agrees to the proposed new preferences; and selecting, by the user, a conference room and joining the meeting.

According to another preferred embodiment, the ML engine analyzes the user input and proposes a meeting room. In case the current state of the meeting room violates the selected preferences, the user is requested by the system to set preferences again.

New preferences in the meaning of the present invention are preferences provided by the system to the user according to the input given by the user that are different to the preferences given by the user directly after his/her registration to the system.

According to another preferred embodiment, in case the user does not agree to the new preferences proposed by the system, the method further comprises: requesting, by the system, from the user to set preferences; requesting, by the system, input from the user; analyzing, by the machine learning (ML) engine, the user input; providing, by the system, a list of conference rooms to the user, in case no discrepancy between the user's preferences and input is detected by the system; selecting, by the user, a conference room and joining the meeting.

According to yet another preferred embodiment, the method further comprises: checking, by a privacy module of the system, the anonymity of at least one user based on the user preferences; receiving, by the system, feedback from the user regarding the conference room; and ending the method, in case no re-adjustment of the conference room is necessary.

In the meaning of the present invention, feedback from the user may be in any of a number of forms (e.g. the form of a button which the user could click to approve to the selection of the meeting room, and/or the user could be requested, by the system, to give feedback in text, voice and/or video and/or other communication medium, etc.). When requesting feedback in form of text, voice, or video, the ML engine can analyze the text, voice or video data to identify the user's feedback.

According to still another preferred embodiment, in case a re-adjustment of the conference room is necessary, the method further comprises: adjusting, by the system, the conference room list to the user preferences; providing, by the system, said adjusted list of conference rooms to the user; selecting, by the user, a conference room and joining the meeting.

Further, according to a preferred embodiment, the privacy module may detect personal identifiable information (PII) revealed by the user to the conference room; in this case, the system may send notifications to the user informing him/her that no other participant(s) has/have shared similar pieces of data so far. Further, the system may wait within a time-window t for other conference participants to share similar pieces of data. If other participants do share similar data in the defined time-window, the system may notify the user accordingly to indicate that there is a safe anonymous context and other participants have also shared similar information. In a preferred embodiment, the time-window t is 20 to 90 seconds, preferably 30 to 80 seconds, more preferably 40 to 70 seconds and most preferably 60 seconds. In another embodiment, the time-window t is 2 to 8 minutes, preferably 3 to 7 minutes, more preferably 4 to 6 minutes and most preferably 5 minutes.

According to yet another preferred embodiment, in case the other participants do not reveal similar information, the method further comprises: creating, by the system, bots that share similar data like the user in order to protect said user; sending, by the system, relevant notifications to the user; detecting, by the system, if other participants try to fake the privacy module; and mining, by the system, relevant transactions in one or more blocks in a blockchain.

In case other participants shared similar pieces of data, notifications may comprise information for the user that other users who are real individuals shared similar data. This may become relevant for the user as due to the same characteristics he/she may come into contact with those other users in other meeting rooms again. In case other participants do not share similar data, notifications may comprise information about the creation of bots that share similar data to achieve k-anonymity.

In another preferred embodiment, the system may create bots that share similar data even if other users have also shared data in the conference room. This is done if the user requests enhanced anonymity. The privacy module of the system of the present invention enables the users to select if they want to apply a k-anonymous model for the conference rooms they are joining. Thus, in case they have not consent to share private information with other users, the system may share only those pieces of information (PII) that preserve the privacy of the user but at the same time offer flexibility and do not reject a conference room or other participants based on strict privacy rules. Thus, the system groups users either based on similar characteristics (e.g. PII) or randomly only based on the context (e.g. health issues).

If a user selects the k-anonymous option, the system may monitor who of the other participants offer similar PII to the user. The relation between two users in a conference room is an indication that the user's identity can be revealed in case specific information is shared. The privacy module according to the invention is another filtering layer over the user input next to the ML engine analyzing the user's input to propose a conference room, so that the user can join a conference room that fits to the input received by the system and also fits to the user anonymity/privacy preferences.

The system may perform a string/sentence match with regard to the semantics and the contextual similarity for each user. The system uses techniques like Jaccard index, Euclidean Distance or Cosine Similarity to identify the meaning of the spoken words based on a relevant transcription. The system may create a relation between the critical words spoken by the users using a simple data structure like a hashmap. The hashmap will store the user ID and the relevant PII which identify the user. So, if, for example, a user who lives in a village has revealed PII, the system may send a private message, indicating to this user that nobody else has shared the location, even worse it may notify the user that there is nobody else living in a small place. This is a reminder from the system that the user may not reveal more PII to the conference room.

In a similar way, if other users have revealed that they live in a village, then the system will create notifications accordingly to let them know that there are other users that have shared similar information. It is obvious that as the subset of users that have already shared similar information increases, the chance that single users can be identified is decreased.

In another embodiment, the system sends a second notification to the user if the user continues to share more information after the first notification has been received and shifts the discussion to the presenter of the meeting room. The presenter is always aware about the private leakage incident and may be in the position to direct the conversation in a way that the leaking is minimized (e.g. to a different person or a different topic). In yet another embodiment, the system does not allow the user to share more personal information by preventing the specific stream clips to be shared with the other participants. On the contrary, the system can store the clips and share them in a later time frame, when more than one participant has shared similar PII.

In the meaning of the present invention, the terms “presenter”, “moderator”, “practitioner” and “doctor” are used interchangeably for a person who is holding an online conference.

In still another embodiment, the system uses legitimate bots which share personal information similar to the user, in order to create a subset of users which share similar PII. This can also be used in the case where the user is the only entity sharing personal information related to a specific topic, and there is no other real user to share relevant info. This is a way to allow the user to offer more PII to the conference room in a way to maximize the session efficiency and the knowledge shared between the practitioner and the participants.

According to still another preferred embodiment, participants trying to fake the system are detected by identifying the same endpoints to convey semantical similar pieces of data with legitimate users.

The endpoints may be malicious users, and/or malevolent/malicious bots. Malicious users/bots, may fake the privacy module by sending similar pieces of information to the user which seeks protection. In this way they may mimic his/her behavior to fool the system. In addition, malicious users/bots may try to reveal information about the user which seeks protection.

In a preferred embodiment, the same endpoints are identified within a time-window m. In another preferred embodiment, the time-window m is between 1 and 10 minutes, preferably between 3 and 8 minutes, more preferably between 4 and 7 minutes and most preferably 5 minutes later than the user shared his/her information. It is particularly preferred, to mine data of malevolent participants in separate blocks.

The user preferences and login data may be stored in the blockchain or database, so that the system can retrieve user preferences and apply the security mechanism accordingly.

It has also to be noted that aspects of the invention have been described with reference to different subject-matters. In particular, some aspects or embodiments have been described with reference to system type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing(s).

REFERENCE NUMERALS USED IN THE DRAWINGS INCLUDE

1 blockchain
2 conference server
3 machine learning (ML) server
4 database (DB) for conference and user data
5 conference room(s)
ML engine machine learning engine
S100-S1000 method steps S100 to S1000

DETAILED DESCRIPTION

Figure 1:
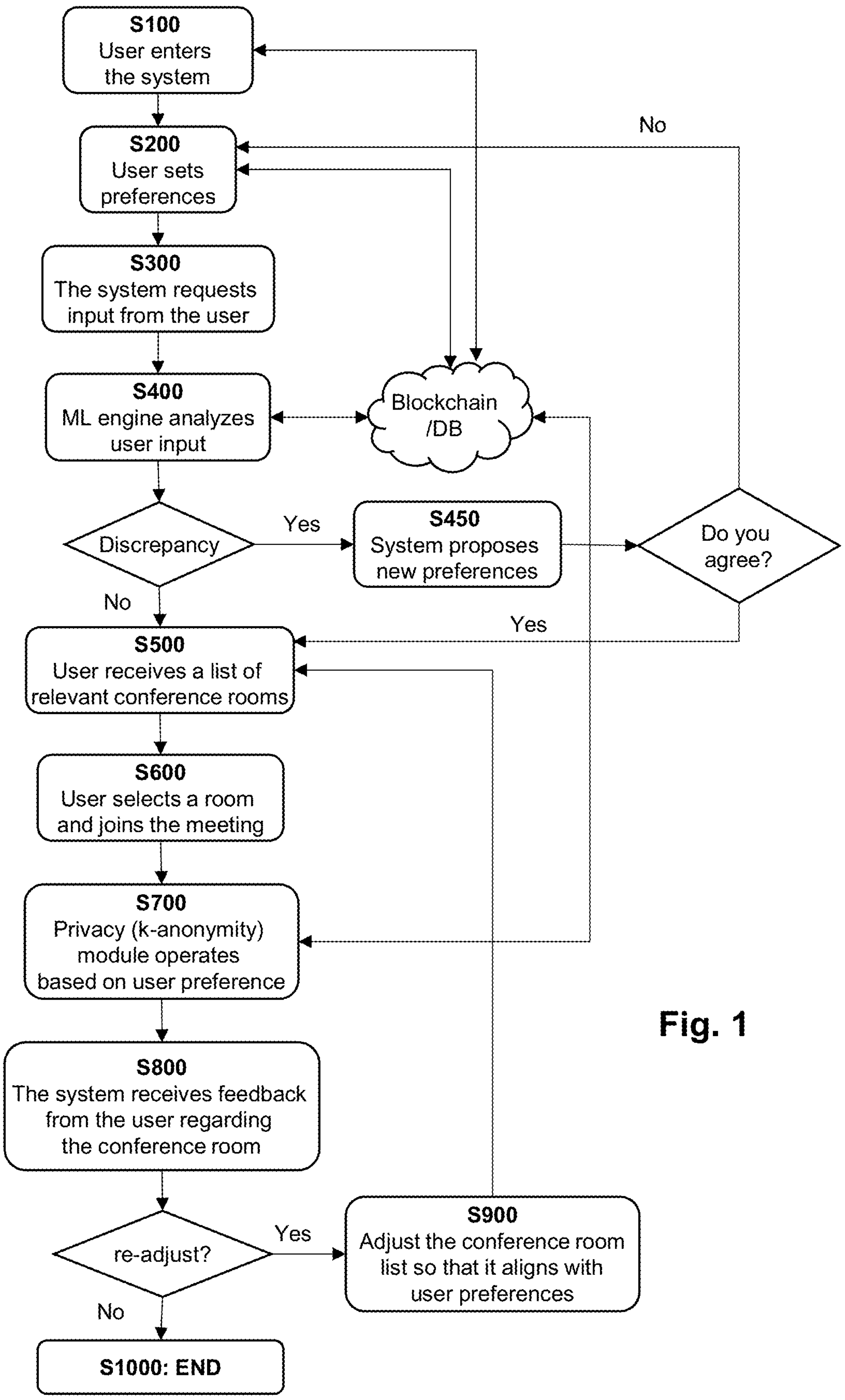
FIG. 1 shows a flowchart of the method according to an embodiment of the invention.

In FIG. 1, a flowchart of an overview of the steps of the method according to an embodiment of the invention is shown. In a first step S100, the system receives a registration by a user. The user may authenticate himself/herself using standard mechanisms that are well-known in the art. During this step, the user may also be requested to pay for the service. The blockchain module of the system may be used as a payment system using a relevant crypto asset like bitcoin or Etherium (ETH). In step S200, the user is requested by the system to set preferences. This may be done using a web interface as depicted above. The user preferences and login data may be stored in the blockchain or database, so that the system may retrieve the user preferences and apply the security mechanisms accordingly. In step S300, the system requests the user to give input. This may be done either using video, audio or text. In the next step S400, the ML engine performs an analysis of the input received from the user in step S300. Depending on the type of input, the state of the user may be inferred by taking into account external indicators like facial expression or the presence of sweat. If the system identifies a discrepancy between the user preferences set in step S200 and the user input given in step S300, the system proposes new preferences to the user in step S450. The user is asked if the new preferences are acceptable to him/her. If the user disagrees to the new preferences proposed by the system, the system returns to step S200 and asks the user to set preferences. If the user agrees to the new preferences proposed by the system in step S450 or if there are no discrepancies in step S400, the user receives a list of conference rooms that fit his/her preferences in step S500. This step may be performed by the conference server or another entity/server of the system. In step S600, the user selects a conference room and joins the meeting which is held in said conference room. In the next step S700, the system deploys the privacy module, taking into account the user preferences. In step S800, the system requests feedback from the user regarding the conference room which may be related to other participants or to privacy issues. If a re-adjustment of the conference room is necessary according to the user's feedback (e.g. the feedback is negative), step S900 is performed to re-adjust the list of the conference rooms so that it aligns with the preferences of the user. After the re-adjustment is finalized, the method is repeated starting from step S500. If no re-adjustment is necessary after step S800 (e.g. the feedback is positive), the method ends in step S1000.

The system can include a conference server or other type of conference system. The system can include at least one conference hosting device that has a processor connected to a non-transitory memory and at least one transceiver for communicatively connected to different user devices or other communication devices for hosting a conference for different users to communicate with each other and participate in the conference. The system can include a media server or other type of communication system elements (e.g. session border controller(s), gateway(s), network node(s), access point(s), or other service hosting devices that may support one or more functions of the conference hosting device that can be communicatively connected to the conference hosting device. The users may interact with the conference that is hosted via the user's own communication device (e.g. a smart phone, a laptop computer, a tablet, a personal computer, etc.).

According to another embodiment of the present invention, a malevolent participant is in the conference room(s) who follows specific user(s) in said conference room(s), so as to receive the maximum pieces of information from those other user(s). The conference room could, for example, hold a group therapy session, a work meeting or an educational class. The group therapy session could be for people who suffer, for example, from a psychiatric disorder, alcoholism, drug abuse, a fatal illness like cancer, a viral and/or bacterial infection, respiratory conditions, like asthma, and/or allergic conditions.

The system may monitor if two or more participants have been in the same conference room for more than w times, along with the time period they stayed in the same sessions, and it may prevent the users to join the same conference room the w+1 time. In the meaning of the present invention, w is a configurable parameter per deployment. In a preferred embodiment, w is in the range of 1 to 10 repetitions, preferably 2 to 8 repetitions, more preferably 3 to 6 repetitions. The system may send a notification to all participants that this situation has been identified and thus the malevolent participant is made aware that the relevant actions are monitored.

If two or more participants want to follow the same group therapy sessions together, this may be set as preferences in the user interface. Thus, a user is able to define in the preferences other users that could be in the same conference room without any problem. Therefore, a user authorizes and consents for which other users he/she wants to share his/her private data with.

According to another embodiment, the system may select the same conference room randomly for two or more users, based on their preferences and their feedback. In this case, the system operates as described above by monitoring and notifying the respective users, if necessary.

According to yet another embodiment of the present invention, a user may identify a participant as malevolent and mark him/her as suspicious with a flag. The system matches the flag with the user's identity who has marked the other participant and removes said marked participant from future conference room matches with said user.

Further, according to another embodiment of the present invention, when the user wishes to enter a conference room with a group of friends, the system uses this group of users as one user and selects the conference room based on either the group leader's preferences or the most voted preferences between the group members. The web interface may comprise a selection that a user is able to add himself/herself as the group leader and add the relevant team members. Upon selecting himself/herself as group leader, the function of selection of group leader will get deactivated for the rest of the team members. If a member of the group wishes to exit the conference room and enter another conference room without the rest of the group members, said user can re-enter his/her preferences and search for a list of available conference rooms that match his/her preferences.

Figure 2:
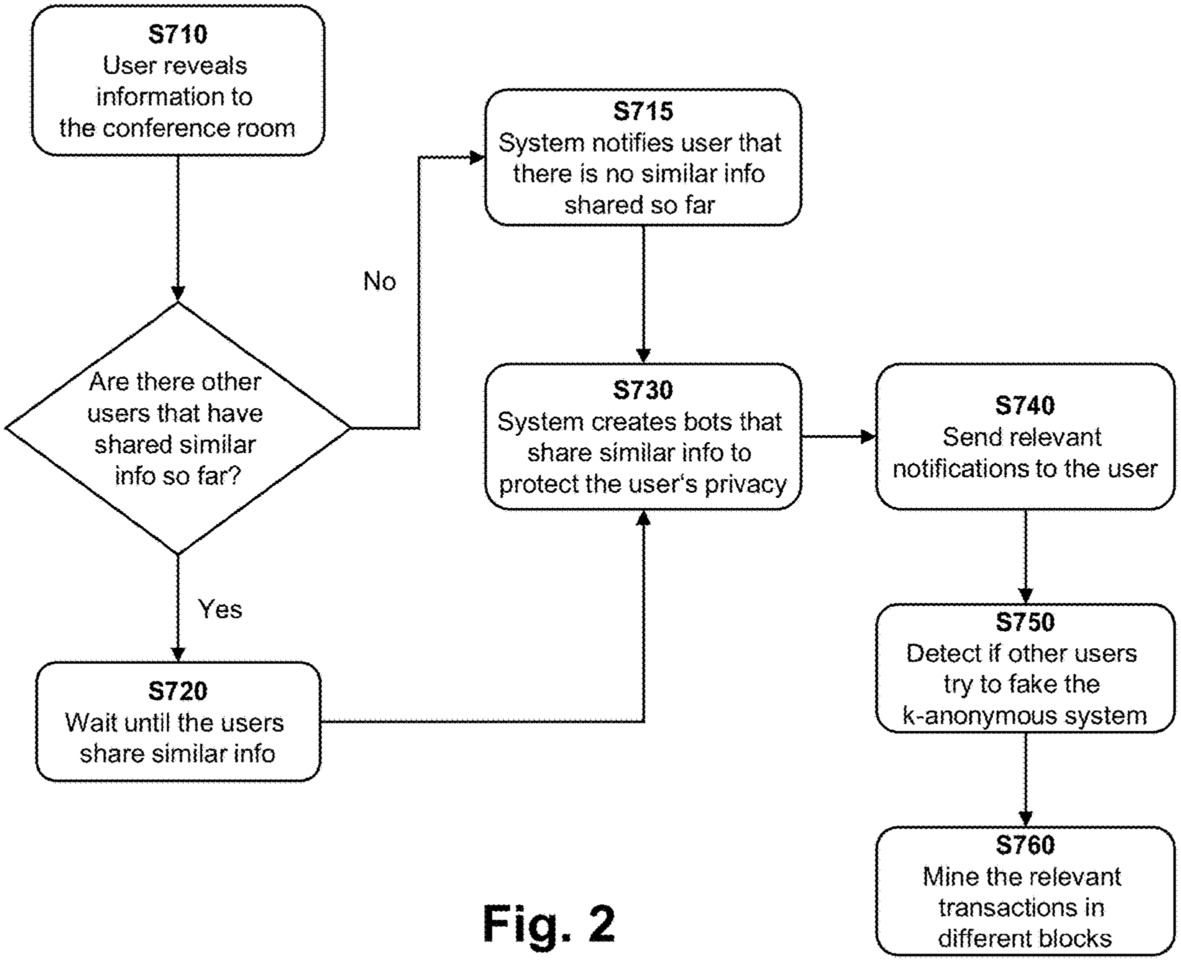
FIG. 2 shows a flowchart of the method according to another embodiment of the invention.

FIG. 2 shows a detailed flowchart of the method steps performed by the privacy module of the system according to the present invention. In step S710, the module detects a Personal Identifiable Information (PII) piece in a specific conference room revealed by a single user, for instance User 1. This info may be stored in the conference server in a related data structure, like for example a hashmap. The system identifies that User 1 is the only one at this point who has shared the relevant PII piece by monitoring the conference participants. The system may convert speech to text and may classify the text in privacy-related categories with a ML classifier like, for example, support vector machines (SVMs). Thus, in step S715, the system notifies User 1 that he/she is the only one in the conference room sharing private data. In a preferred embodiment, the PII piece is not send to the other participants by blurring the affected information and storing the content in the server memory. In another preferred embodiment, the PII piece is nevertheless send to the other participants. In step S720, the system waits for other participants to share similar pieces of data. If this is not done in a time-window t, the system may inform the practitioner with a private message to shift the discussion in context of the information shared by User 1 so that other participants may share similar data. The time-window t is as defined above. In case in step S720 the other users do not reveal personal data in the time-window t, the system in step S730 creates similar PII from legitimate bots, in order to protect User 1 according to his/her preferences. This may also be done if User 1 requests enhanced anonymity although other users have shared similar data. If the other participants share similar data, the system sends a notification to User 1 in step S740 to indicate that there is a safe anonymous context and other participants have also shared similar info. This notification is also sent to User 1 if the system created bots to protect him/her. In step S750, the system detects if other users are trying to fake the privacy system. If the system detects that the same endpoints are found to convey semantical similar pieces of info with other, legitimate users, chronologically later than the legitimate users, more than z times, the system identifies a malevolent user. In step S760, one or more blocks with the conference data revealed by the users can be mined in the blockchain accordingly. If the system detects malevolent user(s), it may mine their data in a separate block in the blockchain. Thus, the relevant PII will not affect the total k-anonymous result over each mined block. Otherwise, the system may mine all the conference data in a single block by preserving the k-anonymity requirement.

The privacy module can be used by a blockchain to give access to data to the public which may be private but can also be used in an anonymous way. The conference data and the personal information of the user may be stored in the blockchain or the database, accordingly. If the user does not consent to use the data for the privacy module, then the data may be stored in a private database. A private database is a database which is only accessible by the conference server. In contrast, the blockchain can be used as a means to advertise a k-anonymous health service for group therapy sessions where the data will be accessible also publicly, by preserving the k-anonymous concept.

In a preferred embodiment, the blockchain may also be used to block attacks on the system. For example, in a sybil related attack multiple entities, e.g. malevolent bots, hold a fake identity to the system. In general, a sybil attack is performed to create a blockchain were each block, or a relevant sequence of blocks mined by the same conference server, are fakely presented as k-anonymous.

Each conference server may mine a unique block that includes transactions related to the different conference rooms. Thus, it is not impossible for one server to select and mine a sequence of blocks for the same conference room. Malevolent bots may use fake identities to pretend to be users who need to take part in a group therapy session. If there are many users in a group session who have a fake identity, being bots controlled by the same botmaster, the botmaster can instruct the bots to circumvent the k-anonymity mechanism of the system. In such an attack the aim of the botnet is to persuade the system that the k-anonymity is preserved in that the bots start conveying similar information given by the legitimate users of the group session, so that the malevolent bots can force the users to reach the limit of the relevant private pieces they have to share with the other users of the conference room. Thus, the legitimate users may not be disguised anymore, and they may reveal info in a non-k−1 user set. If the system identifies similar activities from the same participants in different conference rooms, then this may be an indication that those endpoints participate in a sybil-related attack. These activities may be that the same endpoints which have been found to convey semantical similar pieces of info with other, legitimate users, chronologically later than those users, more than z times or the legitimate users are identified by the fact that they are not participating in the same conference rooms more than z times, compared to the attack endpoints which in essence try to take over the system by dominating with their vote power. If the system of the present invention identifies such actions, it may mine the malevolent PII in separate blocks, totally separated from the legitimate data. In a preferred embodiment, z is a parameter between 3 and 10, preferably 4 to 9, more preferably 5 to 8 and most preferably 6.

Figure 3:
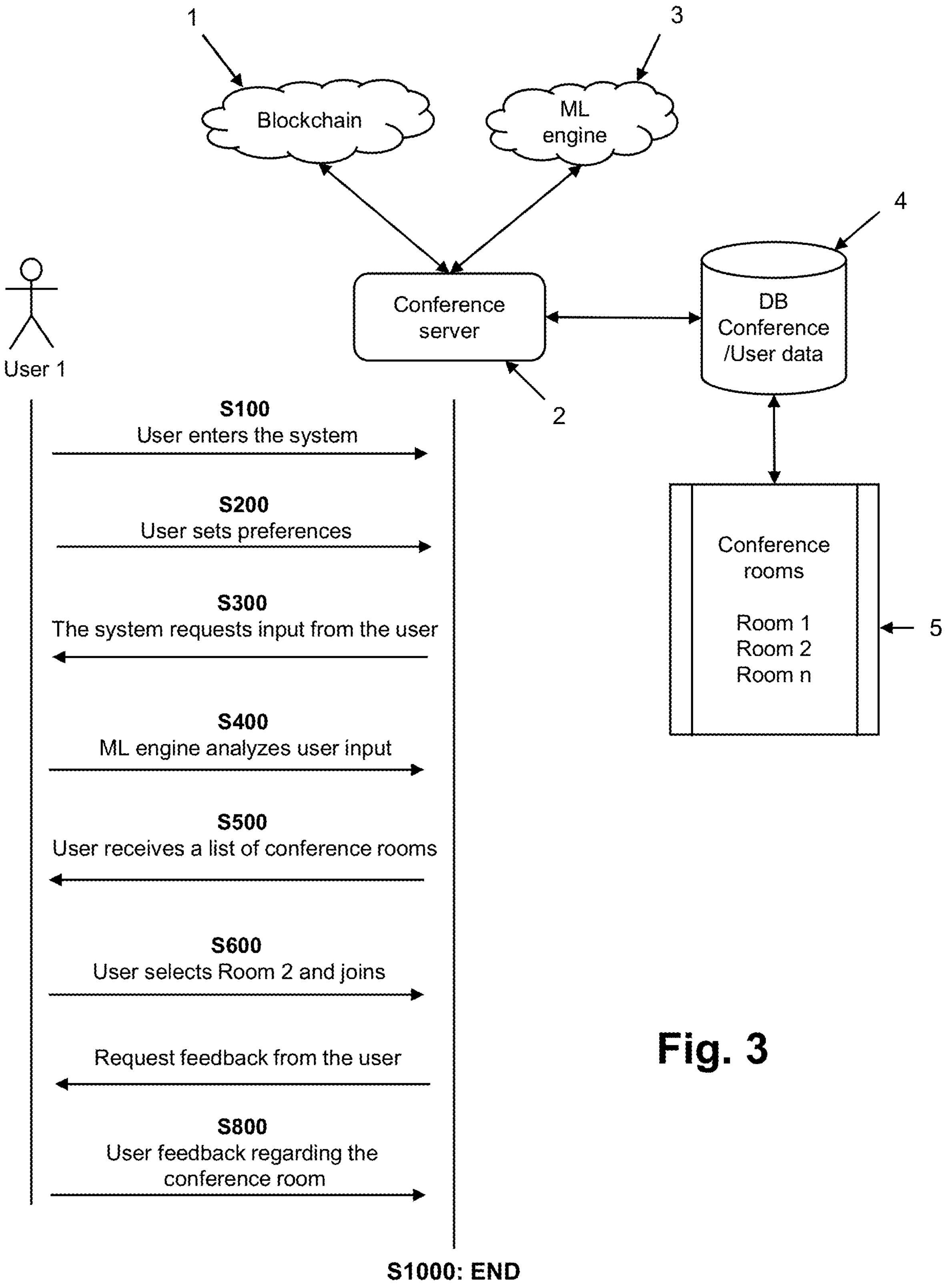
FIG. 3 shows a schematic illustration of an embodiment according to the invention.

In FIG. 3, the standard flow of an embodiment of the method according to the invention is exemplified. In step S100, User 1 enters the system comprising a blockchain (1), a conference server (2), a machine learning (ML) engine (3), a database for conference and user data (4), and at least two conference rooms (5) by using a web interface. In this step the system requests from the user to pay. This step is completed using the blockchain technology, thus, the data of User 1 are stored in the blockchain (1). In the second step S200, the system requests from User 1 to set the desired preferences using the web interface. In step S300, the system requests input from User 1 using voice, text, image or video. In step S400, the ML engine (3) analyzes the input from User 1. The ML engine (3) uses different Natural language processing (NLP) algorithms for the analyzation, such as Lemmatization and Stemming, tokenization, etc. In step S500, User 1 receives a list of conference rooms (5) which matches his/her input and preferences. In step S600, User 1 selects conference room 2 and joins the meeting that is held in said conference room. In step S800, the system receives feedback from the user regarding conference room 2. The feedback is received 5 to 30 minutes after User 1 joined the meeting, preferably 8 to 25 minutes, more preferably 10 to 20 minutes and most preferably 15 minutes after User 1 joined the meeting. In the embodiment illustrated in FIG. 3, the feedback of User 1 about the selected conference room is positive, thus no re-adjustment is necessary, and the method ends in step S1000.

Figure 4:
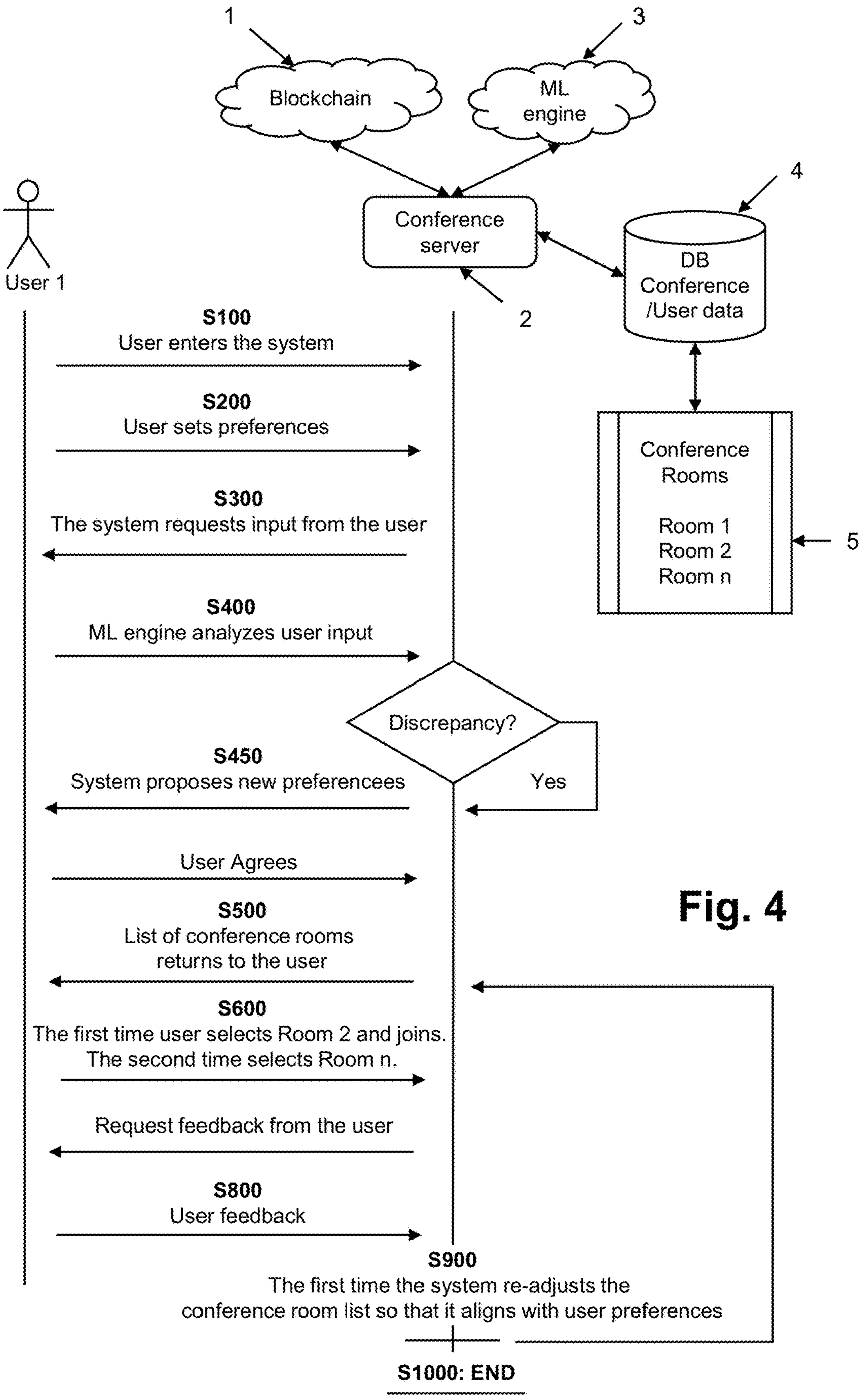
FIG. 4 shows a schematic illustration of another embodiment according to the invention.

FIG. 4 illustrates another embodiment of the present invention. In this embodiment, there is a discrepancy between the user's preferences and input. As already depicted above, the system detects a registration from User 1 and requests User 1 to set preferences (steps S100 and S200). For example, User 1 selects as preferences that the conference room should provide a high level of privacy and should be relevant to shopaholic individuals. In step S300, the system requests input from User 1. User 1 enters the following text "I feel addicted to alcohol" as input. In step S400, the ML engine analyzes the text using Natural Language Processing (NLP) techniques, known in the art. Following this step, the system identifies a discrepancy between the configured preferences (shopaholic) and the input (alcoholic) given by User 1 and proposes new preferences to User 1 (step S450). User 1 agrees with the identified contradiction, and, in the next step S500, the system returns a list of conference rooms related to alcoholism. In step S600, User 1 selects conference room 2 and joins the meeting. In step S800, the system receives feedback from User 1 regarding conference room 2. In the present embodiment, User 1's feedback is negative for conference room 2, and the system re-adjusts the conference room list in step S900 so that it aligns with the preferences set by User 1 in step S200. Negative feedback may be, for example, a message from User 1 depicting that he/she doesn't feel comfortable in the meeting room, that he/she doesn't like the practitioner and/or that he/she detected a possible malevolent user. The system returns to step S500, and User 1 receives a new list with conference rooms. In the next step S600, User 1 selects conference room n. In step S800, the system again receives feedback from User 1, this time about conference room n. The feedback is positive, and the method ends in step S1000.

Figure 5:
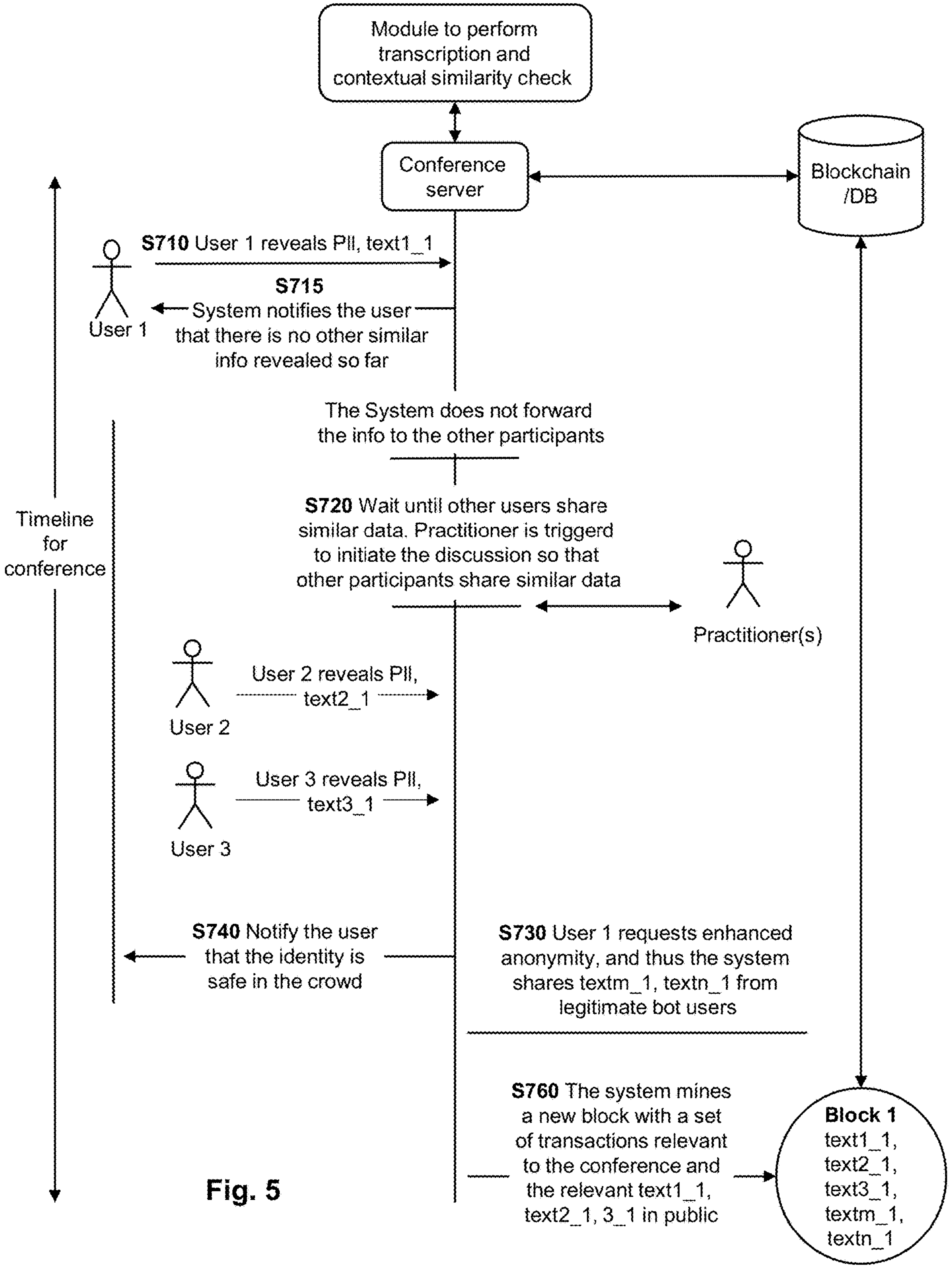
FIG. 5 shows a schematic illustration of yet another embodiment according to the invention.

FIG. 5 illustrates another embodiment of the present invention. According to the present invention, the users may be able to select if they want to apply a k-anonymous model for the conference rooms they are joining. This means that in case they have not consent to share private information with third persons, the system should share only those pieces of information which preserve the privacy of the user but at the same time offer flexibility and do not reject a conference room or other participants based on strict privacy rules. If a user selects the k-anonymous option, the system of the present invention monitors which of the other participants of the joined conference room offer similar PII to the user. The relation between two users is an indication that the user's identity can be revealed in case specific information is shared. In the present embodiment depicted in FIG. 5, a user, User 1, joins a conference room related to advice for heart attack diseases. User 1 reveals PII pieces in text, namely that he/she lives in a village, is overweight and over 70 years old. Two other participants, User 2 and User 3 join the same conference room, and User 1 starts discussing overweight people with heart diseases, and possible outdoor activities that can be performed in nature for people who are retired. At the same time, User 1 shares the info that the overweight factor is not the only responsible for the heart disease, but in his/her family, there is a hereditary genetic disorder which affects all the family members. If User 2 and User 3 are around the same age, also retired, but they live in the city, then it is very easy to identify User 1 as the person who has the hereditary genetic disorder. In the same sense, if User 1, User 2 and User 3 have a genetic disorder, but only one of them is identified to be found to live in a village, it is very easy to infer that the data subject is User 1. To protect User 1's privacy, according to the present invention, the privacy module of the system checks the anonymity of User 1 based on the preferences set by said user.

In the embodiment depicted in FIG. 5, User 1 reveals PII by using text (text1_1) in step S710 as already mentioned above (overweight, over 70 years old, lives in a village). In step S715 the system notifies User 1 that no other user of the conference room has shared similar information so far. To secure the identity of User 1, the system does not forward the PII to the other participants User 2 and User 3. In step S720, the system waits for User 2 and User 3 to share similar data. The practitioner is notified to initiate a discussion so that User 2 and User 3 share similar PII. Due to this, User 2 reveals PII using text (text2_1), and also User 3 reveals PII using text (text3_1). The PII pieces revealed by User 2 and User 3 are also related to heart diseases. In step S730, User 1 requests enhanced anonymity, whereupon the system creates bots that share similar info to protect the user's privacy. Thus, the system notifies User 1 in step S740 that his/her identity is safe within the conference room. In the present embodiment, this info created by bots are textm_1, and textn_1. In step S760, the system mines a new block, Block 1, with a set of transactions relevant to the conference and the relevant text text1_1, text2_1 and text3_1 revealed by the users of the conference room, in public.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should be appreciated that different embodiments of the method, communication system, communication apparatus, and non-transitory computer readable medium can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for automatic conference room selection in a system comprising a blockchain, a conference server, a machine learning (ML) engine, a database for conference and user data stored in non-transitory memory, and at least two conference rooms, wherein the method comprises the steps of:
- receiving, by the system, a user registration;
- requesting, by the system, from the user to set desired preferences;
- requesting, by the system, input from the user;
- analyzing, by the ML engine, the user input;
- providing, by the system, a list of conference rooms to the user, in case no discrepancy between the user's preferences and input is detected by the system;
- selecting, by the user, a conference room and joining a communication session of the conference room;
- checking, by a privacy module of the system, the anonymity of at least one user of a conference room based on the user preferences;
- receiving, by the system, feedback from the user regarding the conference room; and
- ending the method, in case no re-adjustment of the conference room is necessary.

2. The method of claim 1, wherein, in case a discrepancy between the user's preferences and input is detected, the method further comprises:
- proposing, by the system, new preferences to the user;
- providing, by the system, a list of conference rooms to the user, in case the user agrees to the proposed new preferences; and
- selecting, by the user, a conference room of the list of conference rooms provided based on the proposed new preferences and joining a communication session of the selected conference room.

3. The method of claim 2, wherein, in case the user does not agree to the proposed new preferences, the method further comprises:
- requesting, by the system, from the user to set preferences;
- requesting, by the system, input from the user;
- analyzing, by the ML engine, the user input;
- providing, by the system, a list of conference rooms to the user, in case no discrepancy between the user's preferences and input is detected by the system;
- selecting, by the user, a conference room and joining a meeting of the selected conference room.

4. The method of claim 1, wherein, in case a re-adjustment of the conference room is necessary, the method further comprises:
- adjusting, by the system, the conference room list to the user preferences;
- providing, by the system, a list of conference rooms to the user;
- selecting, by the user, a conference room and joining the meeting.

5. The method of claim 1, wherein the operation of the privacy module comprises the steps of:
- detecting, by the privacy module, Personal Identifiable Information (PII), revealed by the user to the conference room;
- sending, by the system, notifications to the user that no other participants shared similar pieces of data;
- waiting, by the system, for other participants to share similar pieces of data.

6. The method of claim 5, wherein, in case there are no other participants that have shared similar data or in case the user requests enhanced anonymity, the method further comprises:

creating, by the system, bots that share similar pieces of data;

sending, by the system, relevant notifications to the user;

detecting, by the system, if other participants try to fake the privacy system; and mining, by the system, relevant transactions in respective blocks.

7. The method of claim 6, wherein participants trying to fake the system are detected by identifying the endpoints that convey semantical similar pieces of data that are the same as semantical pieces of data of other legitimate users.

8. The method of claim 7, wherein the same endpoints are found more than z times later.

9. The method of claim 6, wherein data of malevolent participants are mined in separate blocks of the block chain.

10. The method of claim 5, wherein data of malevolent participants are mined in separate blocks of the block chain.

11. The method according to claim 1, wherein the requesting, by the system, from the user to set desired preferences is performed using a web interface.

12. The method according to claim 1, wherein the requesting, by the system, input from the user is performed using voice, text, image, and/or video generated via the system.

13. The method according to claim 1, wherein the ML engine uses algorithms selected from Natural Language Processing (NLP) algorithms.

14. The method according to claim 13, wherein the NLP algorithm is selected from Lemmatization and Stemming, and tokenization.

15. The method of claim 1, wherein the conference server of the system hosts at least two conference rooms for different communication conference sessions that are communicatively joinable via communication devices of different users that are communicatively connectable to the conference server.

16. The method of claim 15, wherein the conference server of the system has a processor communicatively connected to the non-transitory memory having the database for conference and user data stored therein.

17. The method of claim 15, wherein the ML engine is communicatively connected to the conference server.

* * * * *